(12) United States Patent
Wang et al.

(10) Patent No.: US 11,530,310 B2
(45) Date of Patent: Dec. 20, 2022

(54) METHOD FOR PREPARING FOAMED THERMOPLASTIC POLYURETHANE ELASTOMER PRODUCT

(71) Applicant: MIRACLL CHEMICALS CO., LTD., Shandong (CN)

(72) Inventors: Guangfu Wang, Shandong (CN); Hongwei Song, Shandong (CN); Chongchong Yang, Shandong (CN); Guanglei Ren, Shandong (CN); Renhong Wang, Shandong (CN)

(73) Assignee: MIRACLL CHEMICALS CO., LTD., Shandong (CN)

( * ) Notice: Subject to any disclaimer, the term of this patent is extended or adjusted under 35 U.S.C. 154(b) by 523 days.

(21) Appl. No.: 16/478,290

(22) PCT Filed: Feb. 24, 2017

(86) PCT No.: PCT/CN2017/074658
§ 371 (c)(1),
(2) Date: Jul. 16, 2019

(87) PCT Pub. No.: WO2018/129791
PCT Pub. Date: Jul. 19, 2018

(65) Prior Publication Data
US 2019/0367698 A1    Dec. 5, 2019

(30) Foreign Application Priority Data
Jan. 16, 2017   (CN) .......................... 201710028890.0

(51) Int. Cl.
| | |
|---|---|
| C08J 9/236 | (2006.01) |
| B29C 44/04 | (2006.01) |
| B29C 44/34 | (2006.01) |
| B29C 44/60 | (2006.01) |
| C08J 9/224 | (2006.01) |
| C08L 75/04 | (2006.01) |
| B29K 75/00 | (2006.01) |
| B29K 105/04 | (2006.01) |

(52) U.S. Cl.
CPC ........... *C08J 9/236* (2013.01); *B29C 44/0407* (2013.01); *B29C 44/0415* (2013.01); *B29C 44/3415* (2013.01); *B29C 44/60* (2013.01); *C08J 9/224* (2013.01); *C08L 75/04* (2013.01); *B29K 2075/00* (2013.01); *B29K 2105/04* (2013.01); *C08J 2203/22* (2013.01); *C08J 2375/04* (2013.01); *C08J 2433/00* (2013.01); *C08J 2463/00* (2013.01); *C08J 2475/04* (2013.01); *C08L 2203/14* (2013.01); *C08L 2205/025* (2013.01); *C08L 2207/04* (2013.01); *C08L 2207/53* (2013.01)

(58) Field of Classification Search
CPC ........ C08J 9/236; C08J 9/224; C08J 2203/22; C08J 2375/04; C08J 2433/00; C08J 2463/00; C08J 2475/04; B29C 44/0407; B29C 44/0415; B29C 44/3415; B29C 44/60; C08L 75/04; C08L 2203/14; C08L 2205/025; C08L 2207/04; C08L 2207/53; C08L 2433/04; C08L 33/04; C08L 63/00; B29K 2075/00; B29K 2105/04
See application file for complete search history.

(56) References Cited

U.S. PATENT DOCUMENTS

| | | | |
|---|---|---|---|
| 9,243,104 B2 * | 1/2016 | Watkins | .............. B29C 44/0461 |
| 2007/0142486 A1 | 6/2007 | Limerkens et al. | |

FOREIGN PATENT DOCUMENTS

| | | | | |
|---|---|---|---|---|
| CA | 2929736 A1 | 5/2015 | | |
| CH | 488771 A | 4/1970 | | |
| CN | 1697847 A | 11/2005 | | |
| CN | 104194030 A | * 12/2014 | | |
| CN | 105399917 A | 3/2016 | | |
| CN | 105669929 A | 6/2016 | | |
| CN | 105860126 A | * 8/2016 | .............. C08J 9/224 |
| CN | 105860126 A | 8/2016 | | |
| CN | 104098786 B | 10/2016 | | |
| CN | 106366286 A | 2/2017 | | |
| EP | 3053947 A1 | 1/2016 | | |
| WO | WO 2016/131671 A1 | 8/2016 | | |

OTHER PUBLICATIONS

Data Sheet for Epotal P100. BASF. 2011 (Year: 2011).*

(Continued)

*Primary Examiner* — Kara B Boyle
(74) *Attorney, Agent, or Firm* — Brian C. Trinque; Lathrop GPM LLP

(57) ABSTRACT

The present invention relates to a method for preparing a foamed thermoplastic polyurethane elastomer product, comprising the steps of: 1) coating a binder: coating the binder on the surfaces of expandable thermoplastic polyurethane elastomer particles; 2) curing and molding: adding the product obtained from step 1) to a mold and then placing it in a vulcanizing machine for curing and molding; and 3) cooling and setting: cooling the mold after the molding in step 2) to obtain the product of the present invention. By means of pre-coating the binder on the surfaces of expanded thermoplastic polyurethane elastomer particles according to the present invention, the weight of the binder can be reduced, and the properties of the expanded thermoplastic polyurethane elastomer particles can be utilized to the maximum extent.

12 Claims, No Drawings

(56) References Cited

OTHER PUBLICATIONS

Abstract of DD113488. Jun. 12, 1975. (Year: 1975).*
Indonesian Office Action for Indonesian Patent Application No. P00201906919-TA, dated Feb. 16, 2021, with English translation, 4 pages.
Extended European Search Report for European Patent Application No. 17891752.2, dated Jul. 15, 2020, 6 pages.
First Examination Report dated May 4, 2020 in related Indian Application No. 201937032765 (6 pages).
International Search Report for PCT/CN2017/074658 dated Oct. 25, 2017.

* cited by examiner

METHOD FOR PREPARING FOAMED THERMOPLASTIC POLYURETHANE ELASTOMER PRODUCT

RELATED APPLICATIONS

This application is a 35 U.S.C. § 371 filing of International Patent Application No. PCT/CN2017/074658, filed Feb. 24, 2017, which claims priority to Chinese Application No. 2017100288900, filed Jan. 16, 2017, the entire disclosures of which are hereby incorporated herein by reference.

TECHNICAL FIELD

The present invention relates to a method for preparing a thermoplastic polyurethane elastomer product, and in particular to a method for preparing a foamed thermoplastic polyurethane elastomer product. The present invention belongs to the field of lightweight materials.

BACKGROUND OF THE INVENTION

A foamed polymeric material has a polymer matrix within which a large number of cellular structures generated physically or chemically. Since the unique cellular structures of the foamed material offer a series of excellent properties, such as low density, thermal insulation, sound insulation, high specific strength, and buffering capacity, it can be widely used in the fields of packaging industry, industry, agriculture, transportation industry, military industry, aerospace industry, daily necessities, etc. Commonly used foamed materials include polyurethane (PU)-based flexible and rigid foamed plastics, polystyrene (PS)-based foamed plastics, polyethylene (PE)-based foamed plastics, polypropylene (PP)-based foamed plastics, foamed ethylene-vinyl acetate (EVA), etc. Isocyanate tends to remain in the polyurethane-based foamed plastics during the foaming process, which is harmful to the human body; and the foamed material cannot be recycled. Polystyrene-based foamed plastic products are difficult to degrade and are prone to incur the "white pollution" problem. The UN Environment Organization has decided to stop using PS-based foamed plastic products. Polyethylene-based foamed plastics have poor temperature resistance and are not suitable for applications at a high temperature. Foamed EVA is processed by a mould foaming process, and there are well-established equipments for this process. However, the long-term use of foamed EVA can result in serious loss of elasticity, and the process of preparation is not environmentally friendly.

Thermoplastic polyurethane elastomer (TPU) materials have a wide range of hardness, excellent wear resistance, mechanical strength, water resistance, oil resistance, chemical resistance, and mycete resistance, are environmentally friendly, and can be recycled. Expanded thermoplastic polyurethane elastomer particles have excellent resilience, shape diversity, and low density in addition to the excellent properties of the thermoplastic polyurethane matrix, and can be used over a wide temperature range. Based on the above advantages, TPU foamed materials have a broad application prospect in many industrial fields (e.g., automotive industry, and packaging materials) and the field of daily necessities (e.g., shoe materials, pillows, and mattresses).

CN103371564A discloses a method for producing midsole and insole articles using an expanded thermoplastic polyurethane elastomer particle (E-TPU) material. The articles are processed in a steam-molding apparatus, in which the expanded thermoplastic polyurethane particles are sintered and molded by steam in a specially designed mold. However, such a production equipment is associated with a complicated process, a high equipment cost, a complicated mold design and a low yield, severely limiting the promotion and application of this material. Therefore, the development of a foamed thermoplastic polyurethane elastomer material suitable for a general-purpose mould foaming equipment and a method for preparing the same has become a goal of many companies and research institutions.

SUMMARY OF THE INVENTION

In view of the deficiencies of the existing methods for processing and molding foamed thermoplastic polyurethane, the present invention provides a method for preparing a foamed thermoplastic polyurethane elastomer product.

The technical solution of the present invention for solving the above technical problems is as follows:

A method for preparing a foamed thermoplastic polyurethane elastomer product, characterized in comprising the steps of:

1) coating a binder: coating the binder on the surfaces of expanded thermoplastic polyurethane elastomer particles;

2) curing and molding: adding the product obtained from step 1) to a mold and then placing it in a vulcanizing machine for curing and molding; and 3) cooling and setting: cooling the mold after the molding in step 2) to obtain the foamed thermoplastic polyurethane elastomer product.

In a further embodiment, the binder in step 1) is a hot melt resin having a melting point of 40-200° C., in the form of powder or liquid.

In a further embodiment, the binder in step 1) is one of a thermoplastic polyurethane elastomer, an acrylate, an epoxy resin, a single-component polyurethane, a two-component polyurethane, and an aqueous polyurethane.

In a further embodiment, the hot melt resin in the form of powder has a particle size of 30-5,000 meshes, preferably 50-3,000 meshes, and particularly preferably 300-2500 meshes; and the hot melt resin in the form of liquid has an effective solid content of 5-100 wt %, preferably 10-80 wt %, and particularly preferably 20-50 wt %.

In a further embodiment, the expanded thermoplastic polyurethane elastomer particles in step 1) have a density of 0.001-0.6 g/cm$^3$, preferably 0.05-0.3 g/cm$^3$, and particularly preferably from 0.15 to 0.25 g/cm$^3$, as measured by the ASTM-D792 test.

In a further embodiment, the process of coating the binder on the surfaces of expanded thermoplastic polyurethane elastomer particles in step 1) is one of electrostatic adsorption, spray coating, and dry mixing. The materials can be mechanically mixed using a simple mixer such as a drum mixer or a high-speed mixer, or manually mixed in a plastic container, to obtain expanded thermoplastic polyurethane elastomer particles with the binder coated on the surfaces.

In a further embodiment, the mass ratio of the binder to the expanded thermoplastic polyurethane elastomer particles in step 1) is from 1:1 to 1:10,000.

In a further embodiment, in step 2), the vulcanizing temperature of the vulcanizing machine is 40-200° C., the vulcanizing pressure is 0.01-1 MPa, and the vulcanizing time is 1-30 min.

In a further embodiment, in step 3), the cooling temperature is 10-40° C. and the cooling time is 1-20 min.

The method of the present invention employs a universal well-established mould foaming process and equipment. By adjusting the mixing ratio of the binder to the expanded thermoplastic polyurethane particles and the curing temperature, the expanded thermoplastic polyurethane particles are bonded to each other by the curing effect of the binder, while the excellent elasticity of the expanded thermoplastic polyurethane particles is retained. Therefore, the prepared article has performances such as excellent resilience, flex resistance, compression deformation, etc., thereby overcoming the deficiencies of the steam-molding process, such as unstable bonding between expanded thermoplastic polyurethane particles due to the uneven heating by steam.

The beneficial effects of the present invention are as follows:

1) By pre-coating the binder on the surfaces of expanded thermoplastic polyurethane elastomer particles, the weight of the binder can be reduced, and the properties of the expanded thermoplastic polyurethane elastomer particles can be utilized to the maximum extent.

2) By controlling the curing temperature, the expanded thermoplastic polyurethane particles can be molded with the binder, so it is unnecessary to weld the expanded thermoplastic polyurethane particles through a high-pressure, high-temperature steam medium, thereby avoiding the investment for high-cost steam-molding equipment and the development of corresponding molds and equipments, and eliminating the need for reinvestment and upgrading of the equipments. The present method involves a simple and mature production process, has a low production cost, can be easily controlled, and results in a high rate of finished products.

3) The product prepared by the method of the present invention has excellent elasticity, tensile strength and flex resistance, and therefore is much superior to the foamed thermoplastic polyurethane product prepared by the current steam-molding process.

DETAILED DESCRIPTION OF THE INVENTION

The principles and features of the present invention are described below in connection with the examples, which are intended to illustrate the present invention only and are not intended to limit the scope of the present invention.

Example 1

A method for preparing a foamed thermoplastic polyurethane elastomer product was performed by the following steps:

(1) 1 part by weight of a thermoplastic polyurethane powder (Mirathane® H306) was coated on the surfaces of 1 part by weight of expanded thermoplastic polyurethane particles by electrostatic adsorption, wherein the thermoplastic polyurethane powder had a melting point of 80-100° C. and a particle size of 30 meshes; and the expanded thermoplastic polyurethane particles had a density of 0.6 g/cm$^3$, a white appearance, and an elliptical shape.

(2) 100 g of the above expanded thermoplastic polyurethane elastomer particles with the binder coated on the surfaces were weighed and filled into a product mold.

(3) The product mold from step (2) was placed in a flat vulcanizing machine for molding, curing and molding, wherein the vulcanizing temperature of the flat vulcanizing machine was 100° C., the vulcanizing pressure was 0.01 Mpa, and the vulcanizing time was 2 min.

(4) The product mold from step (3) was cooled with cooling water at a temperature of 10° C. for 1 min, to obtain the final foamed thermoplastic polyurethane elastomer product.

Example 2

A method for preparing a foamed thermoplastic polyurethane elastomer product was performed by the following steps:

(1) 1 part by weight of an acrylate adhesive (TA-868) was coated on the surfaces of 10,000 parts by weight of expanded thermoplastic polyurethane particles by a spray coating process, wherein the solid content of the acrylate in the acrylate adhesive solution was 5%; and the expanded thermoplastic polyurethane particles had a density of 0.25 g/cm$^3$, a fluorescent yellow appearance, and a cylindrical shape.

(2) 100 g of the above expanded thermoplastic polyurethane elastomer particles with the binder coated on the surfaces were weighed and filled into a product mold.

(3) The product mold from step (2) was placed in a flat vulcanizing machine for molding, curing and molding, wherein the vulcanizing temperature of the flat vulcanizing machine was 200° C., the vulcanizing pressure was 1 Mpa, and the vulcanizing time was 30 min.

(4) The product mold from step (3) was cooled with cooling water at a temperature of 40° C. for 20 min, to obtain the final foamed thermoplastic polyurethane elastomer product.

Example 3

A method for preparing a foamed thermoplastic polyurethane elastomer product was performed by the following steps:

(1) 1 part by weight of an epoxy resin adhesive (Araldite 2011) was coated on the surfaces of 500 parts by weight of expanded thermoplastic polyurethane particles by a dry mixing process, wherein the epoxy resin adhesive used had an effective solid content of 100% and a particle size of 5,000 meshes; and the expanded thermoplastic polyurethane particles had a density of 0.3 g/cm$^3$, a sapphire blue appearance, and a cylindrical shape.

(2) 100 g of the above expanded thermoplastic polyurethane elastomer particles with the binder coated on the surfaces were weighed and filled into a product mold.

(3) The product mold from step (2) was placed in a flat vulcanizing machine for molding, curing and molding, wherein the vulcanizing temperature of the flat vulcanizing machine was 150° C., the vulcanizing pressure was 0.5 Mpa, and the vulcanizing time was 10 min.

(4) The product mold from step (3) was cooled with cooling water at a temperature of 20° C. for 5 min, to obtain the final foamed thermoplastic polyurethane elastomer product.

Example 4

A method for preparing a foamed thermoplastic polyurethane elastomer product was performed by the following steps:

(1) 1 part by weight of a single-component polyurethane adhesive (WANNATE® 6091) was coated on the surfaces of 100 parts by weight of expanded thermoplastic polyurethane particles by a spray coating process, wherein the single-component polyurethane adhesive liquid used had an effective solid content of 80%; and the foamed thermoplastic polyurethane particles had a density of 0.05 g/cm³, a fluorescent yellow appearance, and a cylindrical shape.

(2) 100 g of the above expanded thermoplastic polyurethane elastomer particles with the binder coated on the surfaces were weighed and filled into a product mold.

(3) The product mold from step (2) was placed in a flat vulcanizing machine for molding, curing and molding, wherein the vulcanizing temperature of the flat vulcanizing machine was 60° C., the vulcanizing pressure was 1 Mpa, and the vulcanizing time was 5 min.

(4) The product mold from step (3) was cooled with cooling water at a temperature of 30° C. for 5 min, to obtain the final foamed thermoplastic polyurethane elastomer product.

Example 5

A method for preparing a foamed thermoplastic polyurethane elastomer product was performed by the following steps:

(1) 1 part by weight of a two-component polyurethane adhesive (Loctite® 8103) was coated on the surfaces of 800 parts by weight of expanded thermoplastic polyurethane particles by a spray coating process, wherein the two-component polyurethane adhesive liquid had an effective solid content of 50%; and the foamed thermoplastic polyurethane particles had a density of 0.15 g/cm³, a pinkish appearance, and a round shape.

(2) 100 g of the above expanded thermoplastic polyurethane elastomer particles with the binder coated on the surfaces were weighed and filled into a product mold.

(3) The product mold from step (2) was placed in a flat vulcanizing machine for molding, curing and molding, wherein the vulcanizing temperature of the flat vulcanizing machine was 70° C., the vulcanizing pressure was 0.8 Mpa, and the vulcanizing time was 10 min.

(4) The product mold from step (3) was cooled with cooling water at a temperature of 25° C. for 10 min, to obtain the final foamed thermoplastic polyurethane elastomer product.

Example 6

A method for preparing a foamed thermoplastic polyurethane elastomer product was performed by the following steps:

(1) 1 part by weight of an aqueous polyurethane (BASONAT® PLR8878) was coated on the surfaces of 1,000 parts by weight of expanded thermoplastic polyurethane particles by a spray coating process, wherein the aqueous polyurethane emulsion had an effective solid content of 20%; and the foamed thermoplastic polyurethane particles had a density of 0.25 g/cm³, a pinkish appearance, and a round shape.

(2) 100 g of the above expanded thermoplastic polyurethane elastomer particles with the binder coated on the surfaces were weighed and filled into a product mold.

(3) The product mold from step (2) was placed in a flat vulcanizing machine for molding, curing and molding, wherein the vulcanizing temperature of the flat vulcanizing machine was 70° C., the vulcanizing pressure was 0.8 Mpa, and the vulcanizing time was 10 min.

(4) The product mold from step (3) was cooled with cooling water at a temperature of 25° C. for 10 min, to obtain the final foamed thermoplastic polyurethane elastomer product.

In order to verify the performances of the foamed thermoplastic polyurethane elastomer products obtained by the present invention, the products obtained in Examples 1-6 and steam-molded articles were tested as follows. Specific results and data from the test are shown in Table 1.

TABLE 1

Data from the performance test of the products obtained in Examples 1-6 and the steam-molded articles

|  | Tensile strength (Kg/cm²) | Ball rebound (%) | Flex resistance (mm/kC) | Compression deformation (%) |
|---|---|---|---|---|
| Example 1 | 1.6 | 60 | 0.5 | 30 |
| Example 2 | 2.0 | 60 | 0.4 | 25 |
| Example 3 | 1.8 | 63 | 0.7 | 27 |
| Example 4 | 2.0 | 60 | 0.4 | 25 |
| Example 5 | 1.8 | 62 | 0.6 | 28 |
| Example 6 | 1.8 | 62 | 0.6 | 28 |
| Steam-molded articles | 0.9 | 58 | 1.5 | 45 |

Note: the test standard for tensile strength was ISO179: 2008; the test standard for ball rebound was ISO830: 2007; the test standard for flex resistance was ASTM D1052 (100,000 times); and the test standard for compression deformation was SATRA TM64.

It can be seen from the data in Table 1 that the products prepared by the present invention are superior to commercially available products of the same type in terms of tensile strength, ball rebound, flex resistance and compression deformation.

The above are only preferred embodiments of the present invention, and are not intended to limit the present invention. Any modifications, equivalents, improvements, and so on, which fall within the spirit and scope of the present invention, should be within the protection scope of the present invention.

What is claimed is:

1. A method for preparing a foamed thermoplastic polyurethane elastomer product, comprising the steps of:
   1) coating a binder on surfaces of expanded thermoplastic polyurethane elastomer particles to form a product;
   2) vulcanizing and molding: adding the product obtained from step 1) to a mold and then placing it in a vulcanizing machine at a vulcanizing temperature of 40-200° C. and a vulcanizing pressure of 0.01-1 MPa for a vulcanizing time of 1-30 minutes to vulcanize and mold the product from step 1); and
   3) cooling and setting: cooling the mold after the vulcanizing and molding in step 2) to a cooling temperature for a cooling time to obtain the foamed thermoplastic polyurethane elastomer product;
   wherein the method does not comprise a step of welding the expanded thermoplastic polyurethane particles through a steam medium; and
   wherein the mass ratio of the binder to the expanded thermoplastic polyurethane elastomer particles in step 1) is from 1:500 to 1:10,000.

2. The method according to claim 1, wherein the binder in step 1) is a hot meltable resin having a melting point of 40-200° C., in the form of powder or liquid.

3. The method according to claim 2, wherein the binder in step 1) is one of a thermoplastic polyurethane elastomer, an acrylate, an epoxy resin, a single-component polyurethane, a two-component polyurethane, and an aqueous polyurethane.

4. The method according to claim 2, wherein the hot meltable resin is in the form of powder and has a particle size of 30-5,000 meshes.

5. The method according to claim 3, wherein the hot meltable resin in the form of powder has a particle size of 50-3,000 meshes.

6. The method according to claim 1, wherein the expanded thermoplastic polyurethane elastomer particles in step 1) have a density of 0.001-0.6 g/cm$^3$.

7. The method according to claim 6, wherein the expanded thermoplastic polyurethane elastomer particles in step 1) have a density of 0.05-0.3 g/cm$^3$.

8. The method according to claim 1, wherein the mass ratio of the binder to the expanded thermoplastic polyurethane elastomer particles in step 1) is from 1:800 to 1:10,000.

9. The method according to claim 1, wherein the process of coating the binder on the surfaces of expanded thermoplastic polyurethane elastomer particles in step 1) is one of electrostatic adsorption, spray coating, and dry mixing.

10. The method of claim 1, wherein in step 3), the cooling temperature is 10-40° C. and the cooling time is 1-20 minutes.

11. The method according to claim 2, wherein the hot meltable resin is in the form of liquid and has an effective solid content of 5-100 wt %.

12. The method according to claim 11, wherein the hot meltable resin in the form of liquid has an effective solid content of 10-80 wt %.

* * * * *